United States Patent [19]

Matsumura et al.

[11] Patent Number: 4,693,543
[45] Date of Patent: Sep. 15, 1987

[54] OPTICAL INTEGRATED CIRCUIT

[75] Inventors: Hiroyoshi Matsumura, Saitama; Koji Ishida, Musashino, both of Japan

[73] Assignee: Hitachi, Ltd., Tokyo, Japan

[21] Appl. No.: 711,507

[22] PCT Filed: Jun. 15, 1984

[86] PCT No.: PCT/JP84/00311
§ 371 Date: Mar. 7, 1985
§ 102(e) Date: Mar. 7, 1985

[87] PCT Pub. No.: WO85/00431
PCT Pub. Date: Jan. 31, 1985

[30] Foreign Application Priority Data

Jul. 8, 1983 [JP] Japan ................. 58-123239

[51] Int. Cl.⁴ ............................... G02B 6/12
[52] U.S. Cl. ................... 350/96.11; 350/96.12
[58] Field of Search ............... 350/96.11, 96.12

[56] References Cited

U.S. PATENT DOCUMENTS 4,286,838  9/1981  Huignard et al. ............. 350/96.11
4,472,020  9/1984  Evanchuk ...................... 350/96.12
4,609,252  9/1986  Wong et al. ................... 350/96.12

FOREIGN PATENT DOCUMENTS 51-88041   8/1976  Japan .
53-139550  5/1978  Japan .
59-24806   2/1984  Japan .
1512452    4/1975  United Kingdom .

Primary Examiner—William L. Sikes
Assistant Examiner—Frank González
Attorney, Agent, or Firm—Antonelli, Terry & Wands

[57] ABSTRACT

The present invention relates to an improvement in the optical transmission characteristics of a ridged type of optical waveguide in an optical integrated circuit. The invention is directed to reducing the effects of irregularities in the ridge sides on the optical transmission losses of the optical waveguide. According to the present invention, therefore, a hardened film of a heat-resistant, high-molecular resin is applied over the ridges and the optical waveguide, greatly reducing the optical transmission losses in the optical waveguide. An appropriate thickness of the heat-resistant, high-molecular resin film is between 200 to 1,000 nm, in consideration of the electric and magnetic fields applied thereto for the operation of the circuit. The present invention makes it possible to provide an optical integrated circuit with an optical waveguide which has low optical transmission losses.

2 Claims, 15 Drawing Figures

OPTICAL INTEGRATED CIRCUIT

TECHNICAL FIELD

The present invention relates to an optical integrated circuit and, more particularly, to an optical integrated circuit which is featured in that it provides an outstanding reduction in optical transmission losses by the use of a heat-resistant high-molecular resin as a cladding layer.

BACKGROUND ART

Generally speaking, an optical integrated circuit is constructed of a complicated combination of structures, as shown in FIG. 1. On a substrate (of, for example, gadolinium-gallium-garnet: GGG) 1, more specifically, an optical waveguide layer (of, for example, yttrium-iron-garnet: YIG) 2 which has a higher refractive index than that of the substrate 1 is formed, and optical waveguide strips (called "ridges") 3 are formed thereon. Light is transmitted through the ridges so that, when two ridges are provided adjacent to each other, as shown in FIG. 1, all the optical energy of the light propagating through ridge 3-1 is transferred to ridge 3-2 within a longitudinal range that is determined by the shape, refractive index, etc., of the ridges. In this case, transfer to the ridge 3-2 can be prevented by placing magnets 4-1, 4-2 which apply magnetic fields to the ridges on the tops of the ridges, as shown in FIG. 2(a), and by controlling the intensities of the magnetic fields thereof so that the light propagating through the ridge 3-1 can emanate from an output terminal for the ridge 3-1. It is customary to use serpentine coils (i.e., wound coils) instead of the magnets to control the magnetic fields. In this case, it is difficult to form the coils directly onto the ridges, and a flat medium must be formed on the ridges before the coils can be formed on the flat medium. On the other hand, when the substrate 1 is made of an electro-optical crystal (e.g., gallium arsenide, GaAs) and the optical waveguide layer 2 is made of an electrooptical crystal which has a higher refractive index than that of the first crystal (e.g., GaAs with a higher resistance), electrodes 5-1 and 5-2 are attached to the tops of the ridges, as shown in FIG. 2(b), and an electrode 6 is attached to the bottom of the substrate so that the transfer of light can be prevented by a control of the voltage between the two terminals. This is the principle of an optical switch within an optical integrated circuit. The former type of switch employs a magneto-optical effect whereas the latter employs an electro-optical effect. Generally speaking, an optical integrated circuit makes use of the electromagnetic effect. FIG. 1 shows the simplest case thereof, but an optical integrated circuit usually has a complicated shape. For example, the optical integrated circuit can have a construction such as that shown in FIG. 3.

A problem with a complicated optical integrated circuit which has such curved optical waveguides concerns how much the optical transmission losses can be reduced. A special problem is losses due to optical scattering. These scattering losses are partly caused by irregularities due to thermal fluctuations in the material making up the optical waveguides, and partly by the structure of the optical waveguides themselves. The former type of scattering is determined by the material, and results in a loss of about 0.8 dB/km for an optical wavelength of 1 $\mu$m, which is so small that it can be neglected in an optical integrated circuit. However, the latter type of scattering varies so much according to the method by which optical waveguides are manufactured that it raises a very serious problem.

In order to form the ridges, a wet-etching method or a dry-etching method is usually used. In the wet-etching method, the desired portions of the YIG or the like are etched with hot phosphoric acid; and in the dry-etching method, the desired portions of the YIG are mechanically etched by argon ions (Ar+) striking the YIG. The sides of the ridges prepared by these methods are irregular, as indicated at 7 in FIG. 4. These irregularities 7 are caused by unevenness in the etching and the material used, or by irregularities in the photo-mask used to form the ridges. The light propagating through the ridges is scattered optically by the irregularities of their sides, so that an optical transmission loss results. This optical transmission loss $\alpha$ is more or less proportional to $(n_1^2 - n_3^2)$, where $n_1$ is the refractive index of the ridges and $n_3$ is the refractive index of the surrounding medium, and is strongly influenced by the period of the irregularities in the ridge sides. These irregularities in the ridge sides are currently about 0.08 $\mu$m. The resultant optical loss at the straight portions of the ridges is equal to or less than 1 dB/cm. The reason for this low transmission loss is that the penetration of optical energy (i.e., the electrical field distribution E) propagating through the ridges to the outside is small at the straight portions, as shown in FIG. 5, so that the irregularities in the ridge sides have only a small effect. As shown in FIG. 5, however, there is a large leakage of optical energy (i.e., the electrical field distribution E) to the outside at the curved portions, so that the irregularities in the ridge sides have a strong effect and increase the optical scattering.

In order to make the influence of the irregularities more apparent, optical integrated circuits were fabricated by making each substrate 1 of $Ga_{0.82}Al_{0.18}As$ and the optical waveguide layer 2 of GaAs, by forming a curved ridge pattern on the optical waveguide layer 2 which had a thickness of 0.8 $\mu$m, and by etching the waveguide layer 2 to leave ridges of a depth of 0.5 $\mu$m and a width of 3 $\mu$m using an ion-milling apparatus. In other words, the ridges were constructed so as to have a width of 3 $\mu$m, a height of 0.5 $\mu$m above the waveguide layer, and a height of 0.8 $\mu$m above the substrate. The ridges were curved with a radius of curvature from 0.7 mm to 0.5 mm. The transmission losses in this optical integrated circuit were measured using an He-Ne laser beam with an optical wavelength of 1.15 $\mu$m. The results thereof are plotted in FIG. 6, the losses are the sums of the curvature losses and scattering losses. For smaller radii of curvature, curvature losses dominate the optical scattering losses so that the loss increases linearly, as indicated by a straight line in FIG. 6. At a radius of curvature of about 0.3 mm, however, the losses diverge from this linear change. This discrepancy is apparently caused by optical scattering. As shown in FIG. 3, there are more portions of curved optical waveguide when the pattern of the optical integrated circuit is complicated. A radius of curvature of about 1 mm is necessary to provide a high-density pattern, although the ridges do not need to have an extremely small radius of curvature such as 0.1 mm, as shown in FIG. 6. Therefore, a reduction in optical scattering is a major concern. In order to reduce the radius of curvature, trials have been made in which the irregularities of the ridge sides are coated with a substance such as that which functions as the cladding of optical fibers, to reduce the effect of the irregularities. This effect is reduced because the difference between the squares of the refractive indices of the ridges and the surrounding medium becomes small, and the scattering losses are proportional to that difference, as mentioned before. Another reason is that the effects of dust, etc., caught by the sides are removed. Since the refractive index of $LiNbO_3$ is about 2.2, for example, a transmission loss of about 35% is ameliorated when the surrounding material is $SiO_2$ glass compared with that of air. This effect is employed in practice. The characteristics required of the coating film are: (1) it coats the irregularities of the sides adequately, (2) its optical transmission losses are small, (3) it generates no strain in the ridges, and (4) it has a refractive index near that of the ridges, i.e., $n_1 \gtrsim n_3$.

At present, the coating of MOS integrated circuits is prepared by sputtering $SiO_2$ or the like (Rib waveguide switches with MOS electro-optic control for monolithic integrated optics in $GaAs-Al_xGa_{1-x}As$., Appl. Opts. 17, No. 16, August 1978, pp 2548 to 2555). This method, however, fails to satisfy conditions (1) and (4) required for optical integrated circuits. Condition (4) is obvious. For condition (1), sputtering or similar methods are not sufficient for smoothing the irregularities on the sides. When the irregularities in the ridge sides vary so much in the heightwise direction that they form "caves", they cannot be completely coated, which means that an air layer (i.e., a layer with a refractive index of 1) remains and increases the optical scattering losses. Although some prior-art optical integrated circuits are mentioned in "Directional Coupler Switch in Molecular-beam Epitaxy GaAs.", Appl. Phys. Lett. 34 (11), 1, June 1979, pp 755 to 757, there is no prior-art example relating to the present invention.

DISCLOSURE OF INVENTION

An object of the present invention is to solve the problems concomitant with the optical integrated circuits of the prior art, and provide an optical waveguide with low losses. To this end, according to the present invention, a hardened film of a heat-resistant high-molecular resin (referred to as simply as "resin film" hereinafter) of a predetermined film thickness is used as the coating film 3.

BEST MODE FOR CARRYING OUT THE INVENTION

The best mode for carrying out the invention will be described in detail below, in conjunction with an embodiment thereof.

Figure 7:
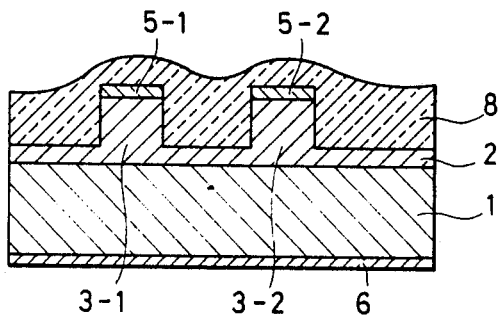
FIG. 7 is a view of an embodiment of the present invention.

FIG. 7 is a view of one embodiment of the present invention, and shows a section through the structure of part of an optical integrated circuit in which a 200 nm thick, hardened film of polyimide resin, e.g., polyimideisoindroquinazolindion (abbreviated to "PII" hereinafter) is used as a coating layer 8 over an optical waveguide layer 2 of a refractive index of 3.4, which is formed on a GaAs substrate 1 and has GaAs ridges 3-1 and 3-2. The PII film 8 is provided, after electrodes 5-1 and 5-2 are formed on the ridges 3-1 and 3-2, by the application of a liquid prepared by dissolving predetermined quantity of PII in a solvent (e.g., a 1:1 mixture of N-methyl 2-pyrolidone and N, N-dimethylacetamide) by a rotary application method, and by a subsequent heat treatment to effect hardening.

Figure 1:
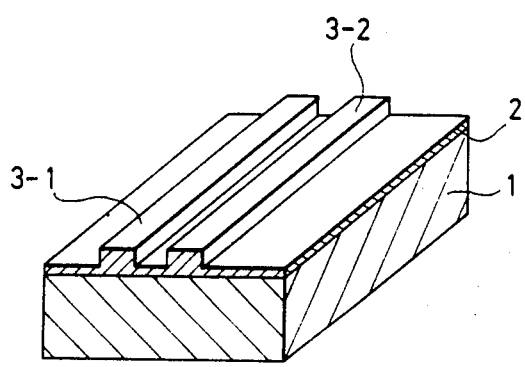
FIGS. 1 and 3 are views of fundamental constructions of optical integrated circuits.
Figure 2A:
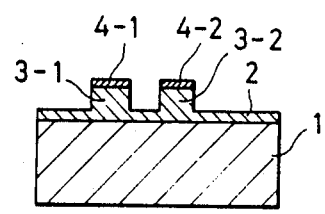
FIGS. 2 are sections therethrough.
Figure 2B:
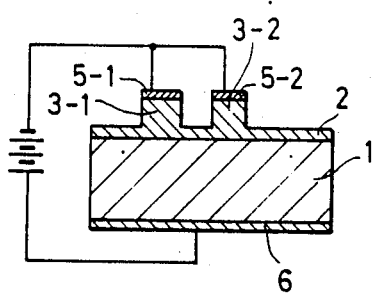
Figure 3:
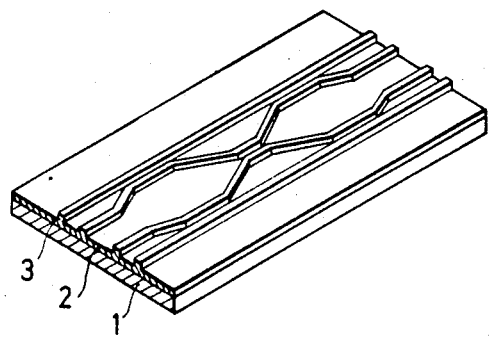
Figure 4:
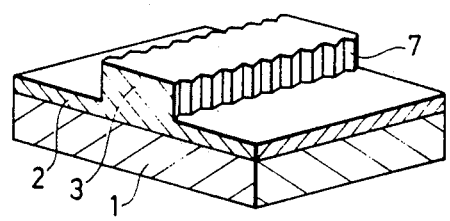
FIGS. 4 and 5 are a view of irregularities and the migration of the electric field at the curved portions thereof, respectively.
Figure 5:
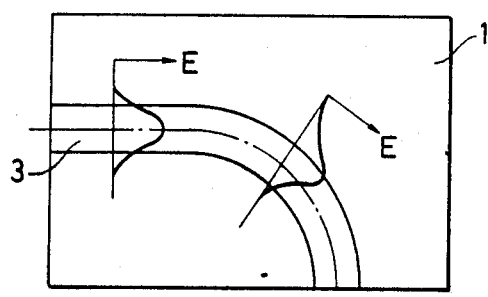
Figure 6:
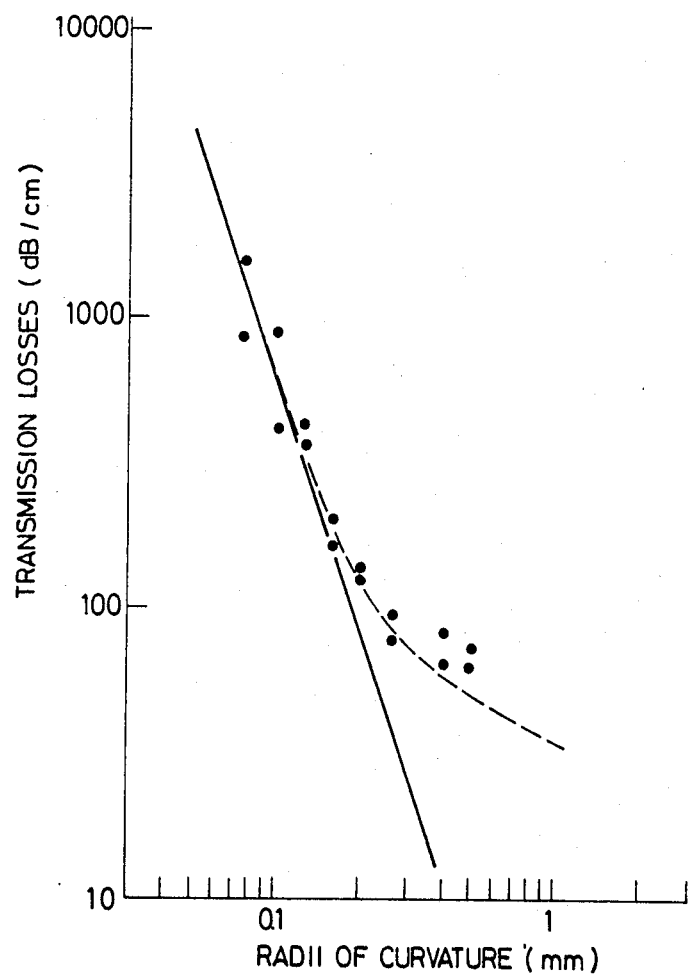
FIG. 6 is a graph of transmission losses against radius of curvature.
Figure 8:
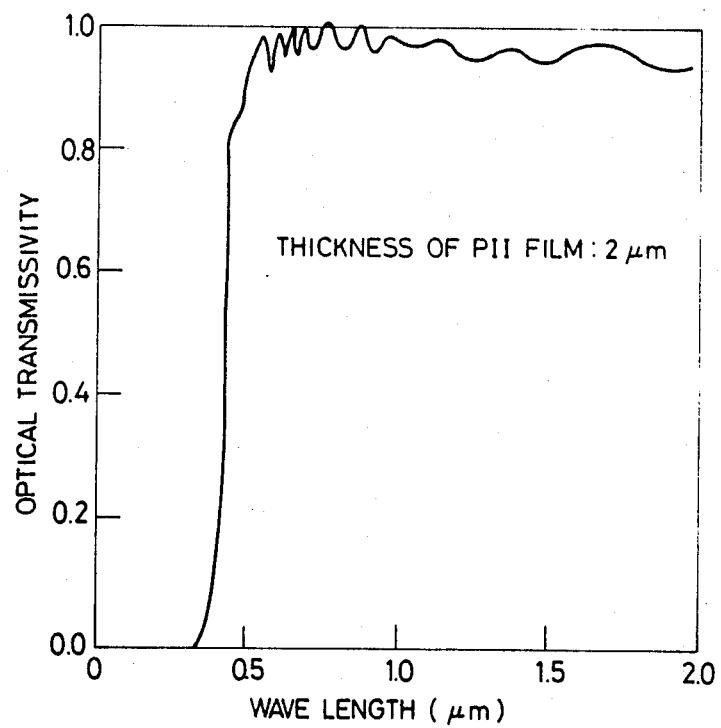
FIG. 8 is a graph of the optical transmissivity of PII.

The thickness of the PII film 8 thus obtained can be determined by the concentration of the PII and the speed of the rotary application. If the PII has a concentration of 8% by weight and the speed is 3,500 rpm, the PII film has a thickness of 300 nm after the heat treatment. If a heat treatment at 350° C. for 1 hour, for example, is conducted after the application of the PII film, it is hardened to provide a film that has suitable characteristics for a coating layer of an optical integrated circuit. Since the PII is applied by rotary application of a solution, it completely covers the ridge irregularities and provides very little deformation, even after it has been hardened, so that it completely coats the ridge irregularities. As shown in FIG. 8, PII has such an excellent optical transmissivity in the wavelength range of above 0.5 μm that the transmission losses of the light are so small that they can be virtually neglected. A PII film has the feature that its refractive index is as much as about 1.72, which is close to those of $LiNbO_3$, GaAs, YIG, etc. In other words, the above conditions set for the coating film are completely satisfied. The use of this PII film for curved ridges, as shown in FIG. 6, has revealed that transmission losses are reduced by about 86% to 9 dB/cm at a radius of curvature of 0.5 mm. Thus the PII film has the advantage that optical transmission losses can be greatly reduced.

A more detailed investigation has revealed the following.

Figure 9:
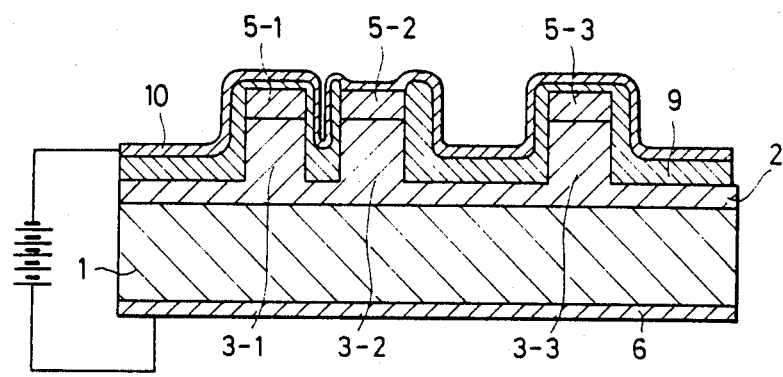
FIG. 9 is a section through a prior-art optical integrated circuit.
Figure 10:
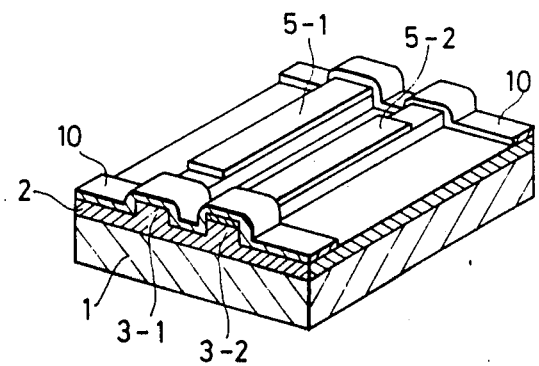
FIG. 10 is an overall view of the prior-art optical integrated circuit provided with lift-off electrodes.

Lead wiring patterns must be formed over an optical integrated circuit so that optical control currents can flow through the individual ridges. An example of a simple structure thereof is shown in FIG. 9. When the electrode of the ridge 3-2 is controlled, electrode strips 10 must be arranged over an insulating layer 9 on the ridges 5-1 and 5-3. This is usually done by using a lift-off process. In a conventional optical integrated circuit, a structure is employed in which the electrodes are attached directly, not over the insulating layer 9 as shown in FIG. 10, after the ends of the ridges 5-1 and 5-3 are partially removed; or a structure is used in which the electrode strips are attached to the ridges over the insulating layer 9, as shown in FIG. 9. As shown in FIG. 9, however, portions of the ridges are formed to have abrupt steps, which make it very difficult to prepare the electrode strips 10 by lift-off. If the insulating layer 9 has steep steps, as shown in FIG. 9, these steep steps could induce breakage or thinning of the electrode strips 10 so that they could be fused by the heat generated therein, and unwanted portions cannot be removed by the lift-off process, greatly reducing the reliability thereof. Since this problem due to the steps becomes even more prominent as the integration of the optical integrated circuit increases, it is absolutely necessary to form the highly integrated circuit so that the insulating layer is flat. Recently, ridge patterns have been formed by ion milling so that the patterns can be made even smaller; the slope of the ridge sides in this case is about 80 degrees, close to perpendicular. As a result, the steps are further enlarged. As shown in FIG. 10, therefore, the method of attaching the electrode strips 10 directly to the ridges is inappropriate for forming a highly integrated circuit. This makes it necessary to adopt the construction of FIG. 9 using the insulating layer 9.

PII film is excellent, not only in its optical characteristics, but also in its electrical insulation properties. The height of the ridges 3-1 and 3-2 is between 200 nm to 1,500 nm, so that if a film of $SiO_2$ of the same thickness of 200 nm as that of the PII film is used as the insulating layer, therefore, the steep steps of FIG. 9 are formed, and these reduce the connectability of the electrode strips 10. If the insulating film is made of PII, however, any irregularities in the surface of the PII film can be reduced and flattened, because PII solution is a liquid. Accordingly, if the PII is left to settle for a predetermined period of time after it has been applied by rotary application or another method, the steps in the surface of the PII film 9 due to the ridges 3-1 and 3-2 are greatly reduced and flattened, so that any steps in the electrode strips 10 are much smaller than those of FIG. 9.

Figure 11:
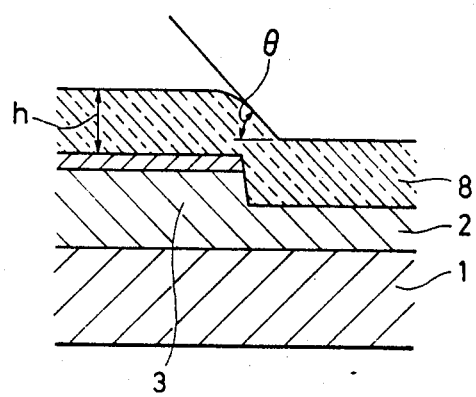
FIGS. 11 and 12 show the thickness and the angle of inclination of the PII film.
Figure 12:
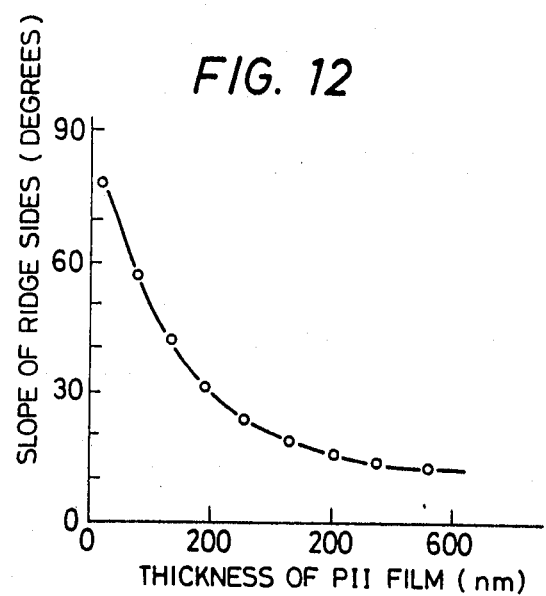

In the present invention, the thickness of the PII film 8 over the tops of the ridges also plays an important role. If the PII film 8 is too thin, the effect of reducing the steps is insufficient, which can reduce the insulation between the electrode 5-1 and the electrode strips 10 in the worst case. If the slope of the stepped portions when the ridges have a height of 350 nm, for example, is $\theta$ as shown in FIG. 11, the slope $\theta$ becomes smaller as the thickness h of the PII film increases, as shown in FIG. 12. When the slope is less than 30 degrees, the electrode strips are not cut. For this reason, the thickness of the PII film must be at least 200 nm. If the thickness h of the PII film 8 is less than 200 nm, moreover, the insulation provided thereby is insufficient. This is why the thickness h of the PII film 8 must be at least 200 nm.

In order to control the magnetic fields within the optical integrated circuit, on the other hand, it is necessary to form serpentine coils on the PII film to apply the magnetic fields to the ridges. If, in this case, the thickness h of the PII film is increased, the strength of the magnetic fields thus applied is reduced. Therefore the film thickness must be less than 1,000 nm.

A large number of heat-resistant, high-molecular resins are available and which can be used in the present invention because they satisfy the above conditions. In addition to polyimides such as PII, for example, epoxy resins, phenol resins, polyamide-imide resins, etc., can be used. Two or more of these resins can be combined.

INDUSTRIAL APPLICABILITY

The present invention makes it possible to provide an optical integrated circuit which has low-loss optical waveguides. The employment of this optical integrated circuit can improve the performance and reduce the size and weight, as well as cost, of circuits transmitting various signals, and also various apparatuses related to these transmission techniques. It is, therefore, obvious that the optical integrated circuit of the present invention has an extremely high utility value.

What is claimed is:

1. In an optical integrated circuit including a substrate, a ridge and an optical waveguide layer, the improvement comprising a hardened film of a heat-resistant, high-molecular weight resin formed over said ridge and said optical waveguide layer.

2. The optical integrated circuit as set forth in claim 1, the improvement further comprising at least an electromagnetic field-controlling electrode and a lead electrode, and said heat-resistance, high-molecular resin film having a thickness of between 200–1,000 nm.

* * * * *